March 29, 1960 H. B. BABSON ET AL 2,930,399
RESILIENT MATERIAL CHECK VALVE
Filed Sept. 21, 1955
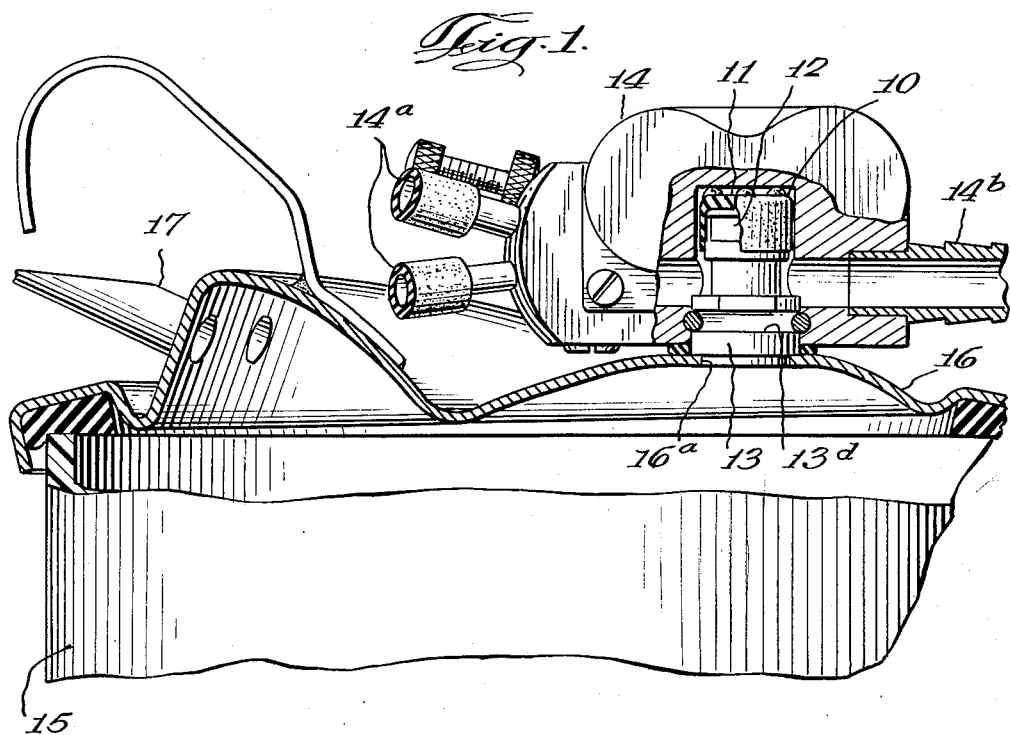
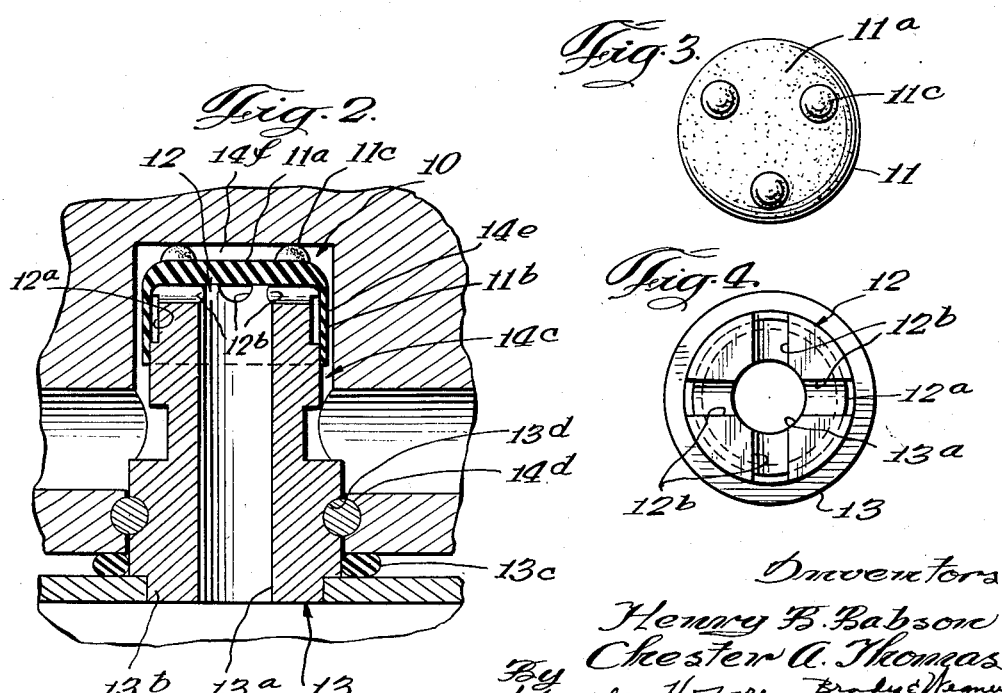
Inventors
Henry B. Babson
Chester A. Thomas
By Schroeder, Hofgren, Brady & Wegner
Attorneys

United States Patent Office 2,930,399
Patented Mar. 29, 1960

2,930,399

RESILIENT MATERIAL CHECK VALVE

Henry B. Babson, Chicago, and Chester A. Thomas, Lake Forest, Ill., assignors to Babson Bros. Co., a corporation of Illinois Application September 21, 1955, Serial No. 535,686

3 Claims. (Cl. 137—525.3)

This invention relates to a milking device and in particular to a check valve for use in producing a vacuum differential between parts of the milking device.

In vacuum milkers a teat cup having a rigid outer shell and a collapsible inner inflation is placed on the animal's teats, the inflation normally having an integral milk tube which communicates with the interior of the evacuated milking device. The interior of the inflation, the milk tube, and the milker bucket, for example, are normally maintained under a relatively constant vacuum which may be of the order of 14 inches of mercury. To obtain a pulsating action on the teat in connection with periodic withdrawal of the milk, the space between the shell and the inflation is alternately subjected to a vacuum slightly greater than the vacuum in the inflation (as 17 inches of mercury) and vented to the atmosphere, through the operation of a pulsator.

While it would be possible to obtain the above described desired vacuum relationships through the use of separate vacuum sources, it has been found advantageous in many milking devices, as the conventional bucket milker, to utilize a single vacuum source and to obtain the desired differential through the use of mechanical pressure differential producing means. Applicants have devised and herein disclose and claim a new and improved check valve particularly for use as a pressure differential producing means in a milker.

A principal feature of the invention is the provision of a new and improved check valve adapted to produce a pressure differential between chambers on opposite sides of the valve by yieldingly extending across a passage between the chambers.

Another feature is that the check valve and valve seat coact to prevent positively a reverse passage therethrough regardless of the positioning of the valve or the pressure differential existing across the valve.

A still another feature is that the valve comprises a valve seat having a bore communicating between the milking device chambers, an annular outwardly opening peripheral groove, and a radial groove effecting communication between the bore and the peripheral groove, and a resilient cup member having a portion yieldingly overlying the peripheral groove and retained thereacross with sufficient tension to seal the groove whenever the difference in pressure between the chambers is insufficient to overcome that tension force.

A still further feature is that the resilient cup is arranged to be readily removable from the valve seat and with all edges thereof being rounded to permit ready cleaning thereof.

Other features and advantages of the invention will be apparent from the following description taken in connection with the accompanying drawings, wherein:

Figure 1 is a fragmentary elevational view, partly in section, of a portion of a milking device having a check valve embodying the invention;

Figure 2 is an enlarged fragmentary sectional view of the check valve mounted in the milking device;

Figure 3 is a top plan view of the check valve cap; and

Figure 4 is a top plan view of the valve seat.

In the exemplary embodiment of the invention as disclosed in the drawings, the check valve, generally designated 10, may be seen to comprise a cup-shaped cap 11 operably associated with a valve seat 12 comprising a portion of pulsator post 13. Removably sealingly mounted on post 13 is a pulsator 14, of any suitable type, which is adapted to interconnect a plurality of tubes 14a alternately with a vacuum hose 14b, leading from a suitable source of vacuum (not shown), and to the atmosphere. Further details of the operation of a suitable pulsator may be found in Thomas Patent 2,646,058.

Pulsator post 13 is provided with a bore 13a extending completely therethrough and communicating between an interior chamber 14c of the pulsator 14 and the interior of a milk bucket 15 through an opening 16a in a lid 16 extending across the opening of the bucket. Pulsator chamber 14c is further in communication with the vacuum hose 14b so that communication between the interior of milk bucket 15 and the vacuum hose 14b through pulsator post 13 and check valve 10 is provided, with check valve 10 acting to limit the flow of fluid to a flow from bucket 15 to vacuum hose 14b and effect a pressure differential between the interior of bucket 15 and tube 14b. A nipple 17 (one of four provided) opens into bucket 15 through lid 16 for connecting the milk tube (not shown) of an inflation to the bucket. Thus, the interior of the inflation, the interior of the milk tube and the interior of milk bucket 15 are maintained at the same level of vacuum.

Pulsator post 13 comprises a generally tubular member having its inner end 13b fixedly secured to lid 16. Sealing means, such as an O-ring 13c, are provided concentrically surrounding the post at its inner end 13b and outwardly of lid 16 to seal the pulsator 14 to the lid 16 and the post 13 when the pulsator 14 is mounted thereon. An outwardly opening annular groove 13d is provided adjacent the post end 13b for cooperation with suitable locking means 14d carried by a pulsator 14 acting removably to secure the pulsator 14 to the post 13. Pulsator chamber 14c is preferably cylindrical and received therein is the outer end of pulsator post 13, comprising valve seat 12. The diameter of chamber 14c is made substantially greater than the external diameter of post 14, thus forming an annular chamber portion 14e therebetween, and the depth of the chamber is made greater than the projection of the valve seat 12 thereinto resulting in a generally cylindrical chamber portion 14f at the outer end of post 13.

The portion of post 13 comprising valve seat 12 is provided with a peripheral annular groove 12a opening outwardly into chamber portion 14e and at least one, and preferably a plurality thereof, radially extending slot 12b communicating between groove 12a and bore 13a of the pulsator post. In the embodiment now being described, slots 12b open outwardly into chamber portion 14f and groove 12a is spaced from the outer end of post 13 approximately one half the depth of the slots. Such construction provides ample communication between groove 12a and the slots while being extremely simple of manufacture.

Cap 11 comprises a generally cup-shaped member preferably formed of a resilient material, such as rubber, and having a lateral portion 11a with a depending peripheral flange 11b. Flange 11b is generally tubular and is provided with an internal diameter slightly less than the external diameter of valve seat 12 so that it is under slight tension when the cap 11 is placed over the valve seat 12, as seen in Figure 2. The external diameter of flange 11 is made somewhat less than the internal diameter of chamber 14c so that radially outward movement through chamber portion 14e may be had. A plurality of projections 11c, preferably semi-spherical in shape, are provided upstanding from lateral cap portion 11a and are dimensioned so that the total thickness through lateral portion 11a and the projections 11c is somewhat greater than the depth of chamber portion 14f thereby causing lateral portion 11a to be clamped tightly when the pulsator 14 is mounted on post 13, while allowing free air flow through chamber portion 14f.

Cap flange 11b extends completely across groove 12a and preferably overlaps the surface of the post below it by approximately 3/32 of an inch. Thus, any radially inward urging of the flange 11b due to a greater vacuum pressure in the milk bucket 15 and consequently in the groove 12a than is had in the chamber 14c acts to seal more tightly the cap against the valve seat 12 and prevent positively any flow of fluid from chamber 14c into bore 13a. Conversely, when the vacuum pressure in chamber 14c is greater than the vacuum pressure in the milk bucket 15, flange 11b is urged radially outwardly through chamber portion 14e and permits air to flow from bore 13a into chamber 14c.

As the passage of air is relatively circuitous, passing upwardly through bore 13a, radially outwardly through slots 12b, downwardly therefrom into groove 12a and angularly downwardly between post 13 and flange 11b into chamber 14c, carrying of milk particles by the air into chamber 14c is effectively minimized. Further, by virtue of the positive directional limitation, by check valve 10, of air flow to hose 14b and from bucket 15 any liquid which may reach groove 12a is caused to pass into chamber 14c rather than be washed upwardly back into slots 12b and thus will not be returned to bucket 15, and any condensate or liquid in the vacuum hose or pulsator is also positively prevented from getting into the bucket.

The use of the check valve is extremely simple. With the pulsator 14 removed from the pulsator post 13, the cap 11 is placed over valve seat 12 so that its flanges 11b cover the groove 12a. Pulsator 14 is then placed in position on post 13 being sealed to the cap and the post by means of O-ring 13c and retained thereon by means of locking device 14d cooperating with groove 13d of the post. With the pulsator thus mounted, projections 11c of the cap are forced downwardly and lateral portion 11a of the cap is held securely against the outer end of the valve seat 12.

When vaccum is applied to chamber 14c through vacuum hose 14b, the relatively positive pressure in milk bucket 15, post bore 13a, radial groove 12b and peripheral groove 12a causes the cap flange 11b to be displaced radially outwardly and air to flow between the flange and post 13 into chamber 14c. The pressure in the milk bucket 15 will then be reduced until the differential between the pressure in chamber 14c and that in the bucket 15 is insufficient to maintain the flange 11b in the extended position against the resilient tendency of the flange to close across the valve seat groove 12a. Thus, a pressure differential is maintained between the interior of the bucket and chamber 14c which is directly determined by the force necessary to displace flange 11b. By forming the cup 11 of a material having greater or less resiliency, or by altering the physical characteristics thereof, such as thickening the flange 11b, a variation of the pressure differential obtained may be had. Should the pressure in the milk bucket at any time become sufficiently more positive than the pressure in chamber 14c during the operation of the milking device, additional air is withdrawn through the check valve 10 in the same manner as described above. If at any time during the operation of the milking device, the pressure in bucket 15 is more negative than the pressure in chamber 14c, flange 11b seals more tightly against the seat 12 to prevent positively any back flow.

While we have shown and described certain embodiments of our invention, it is to be understood that it is capable of many modifications. Changes, therefore, in the construction and arrangement may be made without departing from the spirit and scope of the invention as defined in the appended claims.

We claim:

1. In a milking device a check valve of the character described, comprising: a tubular valve seat having an end and a semi-cylindrical groove extending longitudinally across said end to have communication with the interior of the valve seat; and a rubber cup element removably mounted on the valve seat end and extending resiliently across said groove to permit fluid flow outwardly from the groove and prevent fluid flow inwardly into the groove.

2. In a vacuum operated milking device, a flow controlling means of the character described, comprising: a post defining a valve seat having a longitudinal bore extending therethrough from end to end, an annular, outwardly opening peripheral groove at one end, and a radial, outwardly opening groove effecting communication between said peripheral groove and said bore; and a resilient cup-shaped member removably mounted on said end, said member having a transverse portion extending across said radial groove, a depending annular flange yieldingly overlying said peripheral groove, and at least one upstanding projection carried by said transverse portion.

3. In a milking device, a check valve comprising: a pulsator post having a longitudinal bore and an elongated transverse groove defining a circuitous passage therethrough, said groove opening outwardly along its length; and a resilient member removably surrounding the pulsator post to define an outer boundary of the passage at said transverse groove and yieldingly close the transverse outer end of said passage.

References Cited in the file of this patent

UNITED STATES PATENTS

| 1,829,907 | McCormack | Nov. 3, 1931 |
| 2,284,051 | Gilbert | May 26, 1942 |
| 2,603,951 | Ross | July 22, 1952 |
| 2,651,322 | Hendry | Sept. 8, 1953 |

FOREIGN PATENTS

| 292,495 | Italy | of 1932 |
| 1,031,887 | France | Mar. 25, 1953 |